United States Patent [19]

Gorog

[11] 4,455,633
[45] Jun. 19, 1984

[54] METHOD FOR EVALUATING DISTORTIONS IN VIDEO DISC RECORDINGS

[75] Inventor: Istvan Gorog, Princeton, N.J.

[73] Assignee: RCA Corporation, New York, N.Y.

[21] Appl. No.: 370,581

[22] Filed: Apr. 21, 1982

[51] Int. Cl.³ .......................... G11B 3/44; G11B 9/06; G11B 27/00; H04N 5/76
[52] U.S. Cl. ......................................... 369/53; 369/55
[58] Field of Search ...................... 369/53, 54, 55, 47, 369/56, 58; 358/342

[56] References Cited

U.S. PATENT DOCUMENTS

| | | |
|---|---|---|
| 3,842,194 | 10/1974 | Clemens . |
| 4,044,379 | 8/1977 | Halter . |
| 4,060,831 | 10/1976 | Halter . |
| 4,155,098 | 5/1979 | Roach et al. ...................... 369/54 X |
| 4,363,118 | 12/1982 | Roach et al. ........................... 369/58 |

Primary Examiner—Robert L. Richardson
Attorney, Agent, or Firm—E. M. Whitacre; J. S. Tripoli; J. E. Roehling

[57] ABSTRACT

An electromechanical cutting stylus is used in a system for mastering video disc recordings in a metal substrate. The cutting stylus introduces signal distortions and errors into the mastering process such that the quality of the reproduced signal displayed on a television receiver is affected. A non-linear optical system, i.e., a Michelson interferometer, is incorporated to measure the non-linearities introduced by the recording process. The non-linear effects of the optical measuring system may be eliminated or reduced by choosing cardinal operating points for measuring the recording non-linearities. In accordance with one technique the cardinal operating points may be chosen by the steps of utilizing a special test signal which comprises the sum of a high level test signal and a low level pilot signal, analyzing the output of the non-linear optical system, and choosing the cardinal operating points based upon the spectral content of the output of the optical system including the amplitudes of the high level test signal, the low level pilot signal and spurious components thereof.

10 Claims, 4 Drawing Figures

METHOD FOR EVALUATING DISTORTIONS IN VIDEO DISC RECORDINGS

The present invention relates generally to a method for measuring distortions in signals and, more particularly, to a method for measuring signal distortions effected by the recording process in a video disc playback system.

In U.S. Pat. No. 3,842,194, issued to J. K. Clemens, video disc playback systems of a variable capacitance form are disclosed. In one configuration of the Clemens' system, information representative of recorded picture and sound is encoded in the form of a relief pattern in a relatively fine spiral groove on a surface of a disc record. During playback, a stylus engages the spiral groove. Capacitive variations between a conductive electrode on the stylus and a conductive property of the disc record are sensed to recover the prerecorded information.

In accordance with the Clemens' format, the method of recording the prerecorded information may be of a type described in U.S. Pat. No. 4,044,379, issued to J. B. Halter. Pursuant to the Halter method, an electromechanically driven stylus (e.g., of diamond) having a triangular shape, responsive to a combined video and audio signal, records relatively short geometric variations, representative of the time variations of the signal, on a surface of a metal substrate. After the electromechanical recording operation, the recorded surface of the metal substrate has a relief pattern corresponding to that which will appear in the final disc record.

In one embodiment for electromechanical cutting disclosed in the Halter patent, an encoded video signal is additively combined with the accompanying encoded audio signal. In accordance with this method, the accompanying encoded audio signal is obtained by causing the audio signal to frequency modulate a low frequency sound carrier over a low frequency deviation range (illustratively, 716 ±50 KHz). The encoded video signal is obtained from a picture modulator, wherein the composite color video signal (including luminance signals occupying a given band of frequencies and chrominance signals appearing as sideband components of a modulated chrominance subcarrier interleaved with the luminance signal components in an intermediate region of the given band) is caused to frequency modulate a high frequency picture carrier over a high frequency deviation range (illustratively, 4.3–6.3 MHz). The peak-to-peak amplitude of the sound modulator output is held at a level which is small relative to the peak-to-peak amplitude level of the picture modulator output, with an illustrative level ratio being 1:10. The respective modulated carriers are combined in a linear adder and applied to a recorder which may be a Halter electromechanical recorder controlled in response to the signal developed by the adder. The recorder is used to record the composite signal as geometric variations (i.e., undulations) on the metal substrate.

The video disc playback system described in the Clemens' patent is ideally a linear system. That is, the signal recovered from the replicated disc surface during playback is directly proportional to the input signal which was recorded on the metal substrate surface.

In the Halter electromechanical system it is important that the cutterhead move in response to the signal which is being recorded such that the relief pattern on the surface of the metal substrate is an accurate representation of the input signal. The extent to which this condition is met depends on a detailed analysis of the recording process. To confound the problems associated with producing a faithful replica of the electrical signal on the surface of the metal substrate, linear methods of testing the cutterhead or analyzing the surface of the metal substrate are not known. Known measuring systems which have non-linear characteristics tend to introduce spurious signals into the measuring process and thus evaluation of the recording process is difficult, if not impossible, by prior art techniques.

It is of great practical interest to determine if the recording process is linear. If significant distortions occur during the recording, then the playback process will contain spurious signals. These spurious signals may be manifested in the form of objectionable beat notes displayed on the viewer's television receiver. Heretofore, it has been practically impossible to distinguish the non-linearities of the recording process from the non-linearities which are introduced by the measuring system.

In accordance with the principles of the present invention, a measuring system is provided for determining unambiguously the non-linearities and distortions of a recording process.

In accordance with one aspect of the present invention, a method for measuring non-linear distortions produced in the recording process of a video disc system is provided. According to this method, a high level test signal and a low level pilot signal are provided. The low level pilot signal is detected using a non-linear detection system. The non-linear detection system generates at least one spurious component of the low level pilot signal. This spurious component of the pilot signal is detected. The detected low level pilot signal and spurious component thereof are analyzed to determine an operating region for the non-linear system wherein the non-linear system has a substantially linear characteristic. The high level test signal and the non-linear distortions produced in the recording process are measured over the operating region wherein the non-linear measuring system has the substantially linear characteristic. The non-linearities of the recording process are determined from the measuring step.

In accordance with another aspect of the present invention, the method includes driving a recording transducer with the high level test signal and the low level pilot signal. A surface of the recording transducer is illuminated with a beam of coherent light in a Michelson interferometer system. The photocurrent of the interferometer which contains signal components representative of the motion of a surface of the recording transducer is detected. In this system the photocurrent includes spurious signals that are generated by the interferometer system and are not representative of the transducer's motion. An operating region wherein the interferometer system operates in a substantially linear manner is selected by analyzing the low level pilot signal and spurious components thereof. The motional components of the recording transducer are measured over the linear operating region and the non-linear characteristics of the recording process are determined therefrom.

In accordance with a further aspect of the invention, a method is provided for measuring the second harmonic distortion effected by the non-linear characteristics of a video disc recording transducer. The apparatus used for measuring the non-linear characteristics of the recording transducer has certain non-linear characteristics which affect the measurement. Thus, the measurement is confounded by the presence of non-linear distortion effected by the measuring apparatus. According to the method of this invention, the second harmonic distortion (non-linear effect) of the transducer is measured in the presence of the second harmonic distortion (non-linear effect) effected in the measuring process. The method includes a step of driving the transducer with a test signal which comprises a high level signal and a low level pilot signal. A linear operating point is chosen for the measuring system based on the second harmonic content of the pilot signal (a null in the second harmonic of the pilot signal indicates that no distortions are being effected by the measuring system). The amplitudes of the test signal and harmonics thereof made at the linear operating point may be used for determining the non-linearity of the transducer (i.e., the ratio of the amplitude of the second harmonic of the test signal to the amplitude of the test signal is a measure of the second harmonic content).

Other features and advantages of the invention will be more fully understood from the following detailed description of the preferred embodiment, the appended claims and the accompanying drawing in which:

Figure 1:
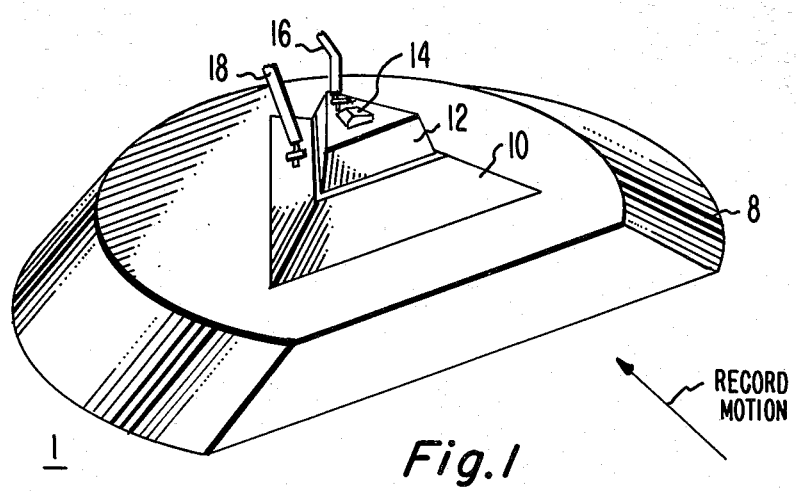
FIG. 1 is a perspective view of a transducer suitable for use in a system for electromechanically cutting a groove in a metal master having an information track comprising short wavelength modulation of the groove depth.

Referring to FIG. 1, a perspective view of an electromechanical transducer 1 suitable for cutting a groove in a metal master having an information track comprising short wavelength modulation of the groove depth is shown. The transducer 1 includes a support 8, pedestal 10, piezoelectric element 12 and cutting stylus 14. The piezoelectric element 12 is rigidly mounted directly between the pedestal 10 and the cutting stylus 14 by means of bonding materials. According to the Halter patent, the pedestal 10 and the piezoelectric element 12 are shaped to form a cutterhead structure having all external surfaces disposed antiparallel to each other. The cutting stylus 14 may preferably be made from diamond material for obtaining relatively flawfree cutting edges and optimum dynamic properties while providing reasonable life for the cutting stylus.

In a system for electromechanically cutting a groove in a metal substrate, e.g., in accordance with the aforementioned Halter patent, the metal substrate (e.g., of copper) is placed on a movable support (e.g., a turntable) in operating relationship with a transducer 1 including a cutting stylus 14. Relative motion is established between the cutting stylus and the metal substrate such that a spiral groove having a quiescent groove depth of less than 1 micrometer is cut. The cutting stylus 14 is vibrated in response to a relatively high frequency signal (e.g., up to 10 MHz) which is applied to a first wire 16 electrically coupled to a metalized surface of piezoelectric element 12 and a second wire 18 electrically coupled to the conductive pedestal 10. The piezoelectric element is responsive to the high frequency signal to be recorded such that the vertical displacement of cutting stylus 14 is in the same direction as the applied electric field. The cutting stylus 14 effects short wavelength modulation of the groove depth having typical peak-to-peak dimensions of less than one-tenth micrometer.

Figure 3:
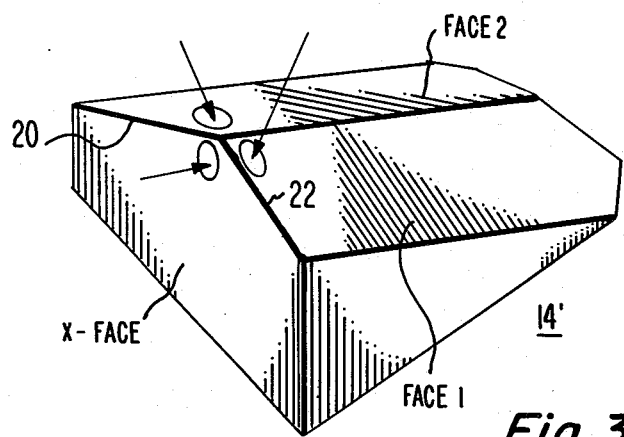
FIG. 3 is a perspective view of a cutting stylus for use in a transducer of a type shown in FIG. 1.
Figure 2:
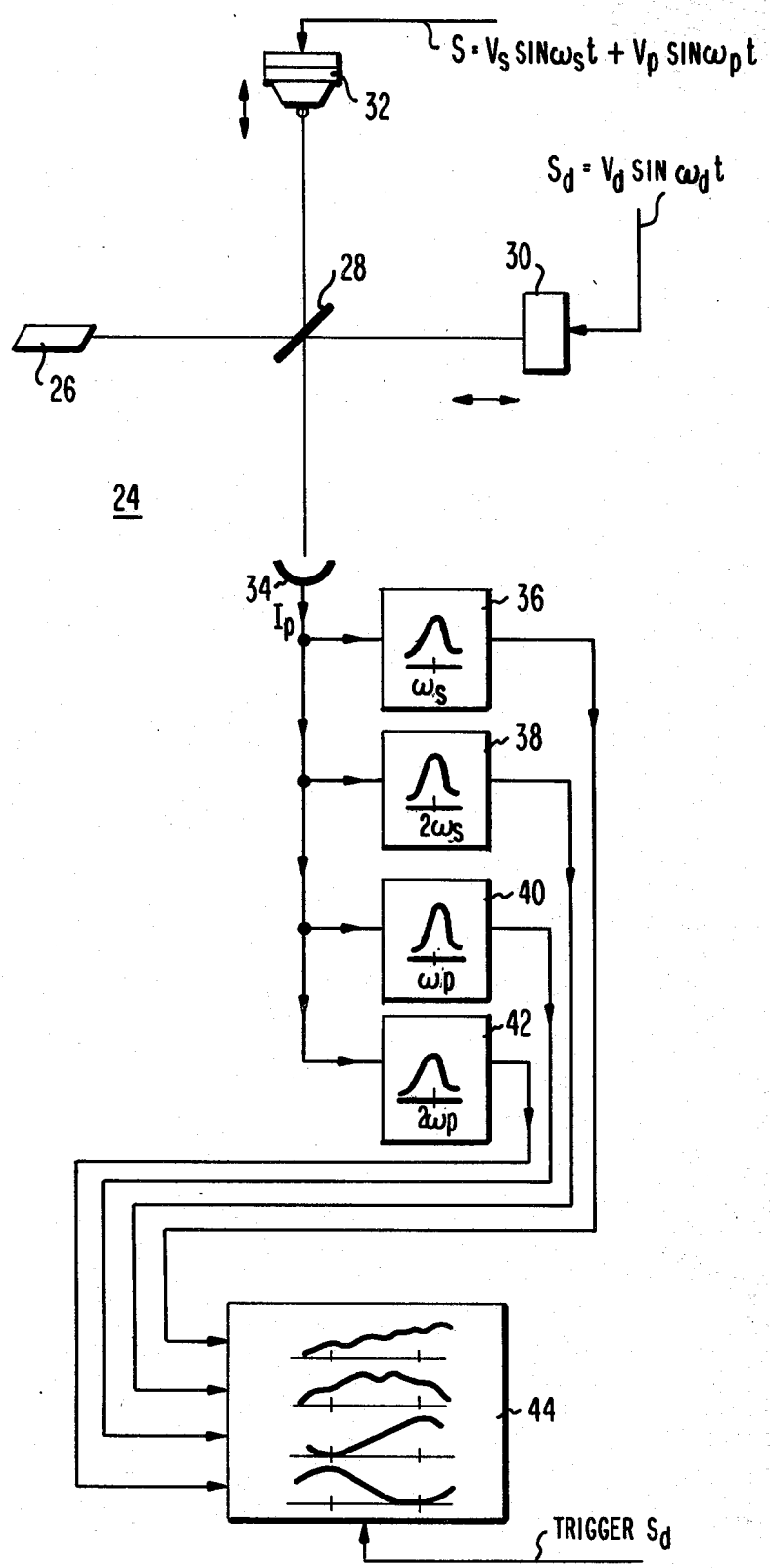
FIG. 2 shows a measuring system useful for measuring non-linear distortions generated in a video disc recording process.

Since the tip of the cutting stylus 14 does the engraving of the signal in the metal substrate, it is important to analyze and characterize its motion. Referring to FIG. 2 a modified Michelson interferometer system 24 for evaluating the motional response at the site of the cutting tip of a cutting stylus is shown. An enlarged perspective view of a cutting stylus 14' is shown in FIG. 3. When cutterhead displacement is measured the beam is positioned successively on the X-face and the two top surfaces (faces 1 and 2) of the stylus within 10–15 $\mu$m of the cutting edges 20 and 22. To obtain the true surface motion in the vertical (Z) direction the measurements from face 1 and face 2 must be vectorially combined. In some cases, the motional components are measured directly by mounting a small reflecting cube on the piezoelectric element 12 of FIG. 1 instead of the cutting stylus.

Figure 4:
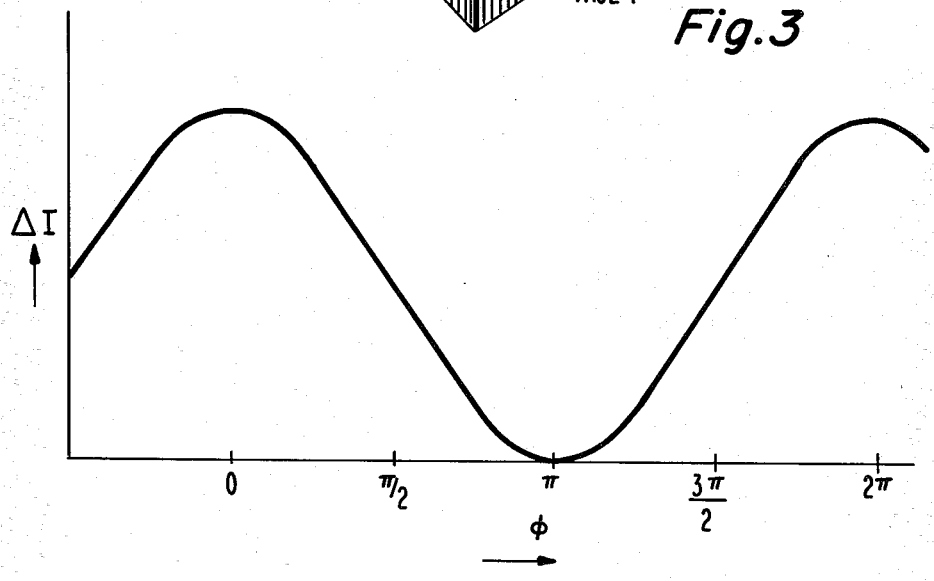
FIG. 4 is a graphical representation of the transfer characteristic of the measuring system of FIG. 2.

For this application, the interferometer 24 may be thought of as a motion to electrical signal transducer. The photocurrent of the interferometer is, in general, not linearly related to the motion of the transducer, but instead, has a non-linear transfer characteristic which may be represented by a non-linear transfer function as shown in FIG. 4 which will be more fully described herein. The transfer function of the photocurrent of the optical system is sinusoidal. Since the transfer function is non-linear, harmonics of the motion of the cutting stylus are generated by the measuring system. Measurement of the non-linearities and determining their impact on performance of transducer 1 has proved to be a difficult problem. For example, prior to the present invention little was known about the non-linearities generated by the transducer because of the difficulties of measuring them. The present invention provides a method for measuring the non-linearities of the signal transducer by effectively compensating for the non-linearities of the optical measuring system. That is, the non-linearities of the measuring system are removed from consideration.

Referring again to FIG. 2, the operation of the interferometer will be described. The beam from a coherent light source (e.g., a He-Ne laser) 26 is split into two beams of equal intensity by beam splitter 28. One of the beams is incident on reference mirror 30. The other beam is incident on the sample 32 to be tested (e.g., transducer 1 of FIG. 1). The reflected beams are recombined at beam splitter 28 and both are incident on the photodetector 34. The combined beams will interfere such that the amplitude of the light which is incident on detector 34 depends on the phase difference between the two beams. The phase difference in the system may be represented by:

$$\phi = \frac{4\pi}{\lambda}(l_2 - l_1) \qquad (1)$$

where: $\lambda$ is the wavelength of the laser light, $l_1$ is the path length between reference mirror 30 and beam splitter 28; and $l_2$ is the path length between sample 32 and beam splitter 28.

The photocurrent output of detector 34 will vary as a sinusoidal function of the phase difference. The photocurrent output may be represented by the equation:

$$I_p = A + I_o \cos \phi \quad (2)$$

where: A is a d.c. term and $I_o$ is a constant. FIG. 4 shows the non-linear transfer characteristic relating the phase difference $\phi$ and the photocurrent $I_p$.

The transfer function of the interferometer is defined to be the functional connection between the motion of the transducer and the output of the photocurrent. In appropriately normalized units the motion of the transducer may be represented by the phase difference $\phi$ as defined in equation (1). The photocurrent $I_p$ is passed through filters 36, 38, 40, and 42 and the output of each filter is displayed as a separate trace on display device 44 (e.g., a multiple trace oscilloscope).

In operation a signal S is applied to drive the cutterhead transducer 32. Signal S includes a high level test signal $V_s \sin \omega_s t$ and a low level pilot signal $V_p \sin \omega_p t$. The amplitude of the pilot signal is chosen to be very small compared to the amplitude of the test signal, i.e., $V_s >> V_p$. In fact, it is chosen to be of a small enough value so that the motion of transducer 32 may be assumed to be linear with respect to the pilot signal. The measurement accuracy of the method of the present invention depends on the ability to determine certain operating points at which the Michelson interferometer operates in a predetermined manner such that a prediction may be made concerning the signals measured at those points. Certain cardinal points, for example, where $\phi = 0$ or $\pi/2$, provide reference points, i.e., bias points, for measuring the signal wherein the distortions introduced by the measuring system are eliminated or their effect may be of interest. Illustratively, the cardinal operating point where $\phi = \pi/2$ provides a reference point wherein changes in the photocurrent $I_p$ are within an approximately linear region of the transfer function and, at this operating point, no second harmonic distortion is generated by the interferometer itself. The method, therefore, depends on the ability to determine certain cardinal operating points.

For an example of a technique for measuring distortions in the recording signal a measurement of second harmonic distortions will be explained. The high level test signal is chosen to have a frequency within the bandwidth of interest, for example, $\omega_s = 2.5$ MHz, which is in the center of the band for a half rate electromechanical recording system according to a preferred Clemens format. The second harmonic of interest for this test signal would appear at $2\omega_s$ or 5 MHz. A low level pilot signal is chosen to have an amplitude which is sufficiently small with respect to the amplitude of the test signal. By choosing a low level pilot signal it may be assumed that the transducer motional components will contain no significant second harmonic terms of the low level pilot, i.e., at $2\omega_p$. Illustratively, the amplitude $V_s$ of the test signal and the amplitude $V_p$ of pilot signal may have peak voltages of 400 volts and 10 volts, respectively, corresponding to approximate peak-to-peak motions of the transducer of 800 Å and 20 Å, respectively. The frequency of the pilot signal, $\omega_p$, is chosen to be close to the signal of interest, i.e., $2\omega_s$. Illustratively, $\omega_p$ may be $2\omega_s + \omega_a$ where $w_a$ is small, e.g., $\omega_p$ may be chosen to be 5.1 MHz. By choosing the pilot signal to be in the vicinity of the signal of interest, there is more assurance that the measurement will be made in a region of the transfer characteristic where the system's behavior may be predicted.

In operation the interferometer is dithered (i.e., the mirror in the reference arm may be vibrated) at a rate which is slow compared to the rate of change of the signals of interest, e.g., the dither frequency may be 550 Hz. The cardinal operating points may be determined by looking for nulls in certain signals. In the system of FIG. 2, the reference mirror 30 may be dithered by a signal $S_d$ where $S_d = V_d \sin \omega_d t$ and where $\omega_d$ is equal to 550 Hz. The trigger input to oscilloscope 44 is also driven by the dither frequency. The filters 36, 38, 40, are chosen, for this example, to pass the fundamental frequency of the high level test signal, i.e., $\omega_s$, the second harmonic of the high level test signal, i.e., $2\omega_s$, the fundamental of the low level pilot signal, i.e., $\omega_p$, and the second harmonic of the pilot signal, i.e., $2\omega_p$, respectively.

The filters are narrow bandpass filters centered on the chosen frequencies of interest and have bandwidths narrow enough to isolate the individual spectral components of interest contained in photocurrent $I_p$. For example, in a second harmonic distortion measurement, the frequencies of interest are the pilot, $\omega_p$, the test signal, $\omega_s$, and the second harmonics of the pilot and test signals, $2\omega_p$ and $2\omega_s$. The filters contain appropriate peak detecting means such that the output signals from the individual filters are measures of the amplitude of the respective isolated spectral components of interest.

The output signals from filters 36, 38, 40, and 42 are displayed on the CRT of oscilloscope 44 such that the top trace corresponds to the fundamental of the test signal, the second trace corresponds to the second harmonic of the test signal, the third trace corresponds to the fundamental of the pilot signal and the fourth trace corresponds to the second harmonic of the pilot signal. When $\phi$ equals zero, only second harmonics of the motional signal generated by the nonlinearities of the interferometer will be seen in the output of the photocurrent because at this point the interferometer photocurrent will not contain any fundamental terms but will contain only second harmonic terms related to the motion of the transducer. On the other hand, when $\phi$ equals $\pi/2$ only the motional signal will be present in the photocurrent because at this point the interferometer is operating in a linear region of its transfer function, therefore, no even harmonic interferometer distortions will be present.

For this example, the second harmonic of the test signal which is introduced by the transducer is of interest. It is known that the interferometer photocurrent is linear at the cardinal point where $\phi$ is equal to $\pi/2$. At the $\pi/2$ point the pilot signal should be present in the photocurrent of the interferometer but the second harmonic of the pilot signal should be a null because the interferometer generates no second harmonics at this point and by selecting the amplitude of the pilot signal to be sufficiently low the transducer generates no harmonics of the pilot signal. (The amplitude of the pilot signal should be as low as possible to assure that the transducer motion is linear with respect to pilot signal excitations, but it has to be high enough to provide a good detection signal-to-noise ratio.) A measure of the test signal amplitude and second harmonic of the test signal amplitude is made at the $\pi/2$ cardinal point, the ratio of the amplitude of the second harmonic of the test signal to the fundamental of the test signal provides a measure of the second harmonic generated by the transducer 1.

To recap, in this example, the second harmonic of the pilot frequency signal is analyzed to find the null position, then the ratio of the amplitude of the second harmonic to the fundamental of the test signal, at the position corresponding to the null, is measured. This ratio provides a measure of second harmonic content attributable to the cutterhead transducer alone. Through experience one can develop standards whereby cutterheads having ratios above a certain level are not used in the recording process, whereas cutterheads with ratios below the certain level are acceptable for use in a recording system.

For another example of a technique for measuring distortions in the recording signal, a measurement of the distortions produced by an amplitude modulated wave and the distortions produced by the baseband signal of a frequency modulated signal will now be given. In the preferred embodiment of the aforementioned Clemens patent, the video information is encoded as a constant amplitude frequency modulated signal. In U.S. Pat. No. 4,060,831 issued on Nov. 29, 1977 to J. B. Halter for "Wideband Electromechanical Recording System" (hereinafter, Halter II) a technique is discussed for equalizing electromechanical cutterheads. According to Halter II cutterheads inherently have a response wherein the amplitude of motion is a strong function of the drive frequency. In Halter II, the cutterheads are equalized to provide a frequency independent amplitude. Because of some of the practical effects of the equalization process frequency dependent amplitude and phase variations may be present in the motion of an equalized cutterhead. The present example provides a method for analyzing the resultant amplitude modulation and baseband distortions exhibited by a non-ideal cutterhead. Residual amplitude modulation of the encoded high frequency information (recorded according to Clemens) may appear as distortion within the band of low frequency information; this distortion may be conveniently measured by operating the Michelson interferometer at the point where $\phi$ equals 0, quadrature bias point, of FIG. 4. The baseband of the encoded high frequency information (recorded according to Clemens) may appear as distortion within the band of encoded low frequency information; this distortion may be measured in accordance with the technique described with reference to the previous example, i.e., measuring second harmonic distortions. In accordance with that technique, the interferometer photocurrent including components in the vicinity of baseband signal for a video signal recorded according to the Clemens format is measured when the Michelson interferometer is operating where $\phi$ equals $\pi/2$, linear operating bias point, of FIG. 4.

It should be clear from the foregoing, that other methods and apparatus may be used for measuring distortions of the recording process of a video disc playback system and the specification herein is not to be considered limiting with respect to such methods. For example, the filters and oscilloscope of the preferred embodiment may be replaced by a spectrum analyzer.

What is claimed is:

1. A method for measuring non-linear distortions produced in a recording process of a video disc system, wherein the signals recorded are recovered in the disc playback system in a substantially linear manner, wherein said method comprises the steps of:

providing a high level test signal and a low level pilot signal to a working member;

detecting said low level pilot signal using a non-linear system, said non-linear system effecting at least one spurious component of said pilot signal;

detecting said at least one spurious component of said pilot signal;

detecting said high level test signal and said non-linear distortions produced in said recording process;

analyzing said detected low level pilot signal and said at least one spurious component of said pilot signal to determine an operating region for said non-linear system wherein said non-linear system has a substantially linear characteristic; and measuring said high level test signal and said non-linear distortions produced in said recording process in the operating region wherein said non-linear system has a substantially linear characteristic and, from said measuring step, determining the non-linear characteristics of said recording process from the ratio of the amplitude of the non-linear distortions to the amplitude of the high level test signal.

2. The method according to claim 1 wherein said providing step includes the step of:

driving an electromechanical transducer with a signal comprising the combination of said high level test signal and said low level pilot signal said electromechanical transducer having a given surface.

3. The method according to claim 2 further comprising the step of illuminating said given surface of said electromechanical transducer with a beam of coherent light.

4. The method according to claim 3 wherein said non-linear system is a Michelson interferometer system.

5. A method for measuring non-linear distortions produced in a recording process of a video disc system, wherein the signals recorded in said video disc system are recovered in a substantially linear manner, wherein said method comprises the steps of:

driving a recording transducer with a high level test signal and a low level pilot signal, said recording transducer having a given surface;

illuminating said given surface of said recording transducer with a coherent beam of light in a Michelson interferometer system;

detecting the photocurrent of said interferometer system, said photocurrent containing signal components representative of the motion of said surface of said recording transducer, said interferometer system having a non-linear transfer function such that spurious signals are introduced in said interferometer photocurrent which are generated by said interferometer system;

selecting an operating region for said interferometer photocurrent wherein said interferometer system operates in a substantially linear manner, said selecting step including the steps of detecting said low level pilot signal and spurious components thereof and analyzing said detected low level pilot signal and spurious components thereof to select a bias point for said Michelson interferometer where said interferometer is operating in said linear region;

measuring said motional components of said recording transducer over said linear operating region, and determining the non-linear characteristics of said recording process by analyzing said motional components of said recording transducer over said linear operating region.

6. The method according to claim 5 wherein said recording transducer is a piezoelectric driven mechanical cutterhead.

7. A method for measuring harmonic distortions produced in a recording process of a video disc system, wherein the signals recorded in said video disc system are recovered in a substantially linear manner, wherein said method comprises the steps of:

driving a recording transducer with a high level test signal and a low level pilot signal, said recording transducer having a given surface;

illuminating said given surface of said recording transducer with a coherent beam of light in a Michelson interferometer system;

detecting the photocurrent of said interferometer system, said photocurrent including signal components representative of the motion of said surface of said recording transducer, said interferometer system having a non-linear transfer function such that said interferometer system generates spurious harmonic signals of said high level test signal and said low level pilot signal, said spurious harmonic signals appearing in said photocurrent, said spurious harmonic signals being representative of the non-linearities of the interferometer system;

detecting said low level pilot signal in said photocurrent;

detecting a predetermined harmonic of said low level pilot signal;

analyzing said low level pilot signal and said predetermined harmonic of said low level pilot signal to determine an operating region for said Michelson interferometer system wherein said interferometer system provides a substantially linear characteristic, said linear operating region being determined by the absence of said predetermined harmonic of said low level pilot signal in said photocurrent over said operating region;

measuring said high level test signal and harmonic distortions of said high level test signal over said linear operating region; and determining the harmonic distortions effected by said recording process from the ratio of the amplitude of said harmonic distortions of said high level signal to the amplitude of said high level test signal.

8. The method according to claim 7 wherein said predetermined harmonic of said low level pilot signal is the second harmonic of said low level pilot signal.

9. The method according to claim 8 wherein said recording transducer is a piezoelectric driven electromechanical cutterhead.

10. A method for measuring signal distortions produced in a recording process of a video disc system, wherein the signals recorded are recovered in the disc playback system in a substantially linear manner, said recorded signals being recorded over a first given band of low frequencies and a second given band of high frequencies, said signal distortions appearing as an amplitude modulation of said high frequency signals being generated within said band of low frequencies and appearing as baseband components of said high frequency signals being generated within said band of low frequencies, said method comprising the steps of:

driving a recording transducer with a high level test signal and a low level pilot signal, said recording transducer having a given surface;

illuminating said given surface of said recording transducer with a coherent beam of light in a Michelson interferometer system;

detecting the photocurrent of said interferometer system, said photocurrent containing signal components representative of the motion of said surface of said recording transducer, said interferometer system having a non-linear transfer function such that spurious signals are introduced in said interferometer photocurrent which are generated by said interferometer system;

selecting a first operating region for said interferometer photocurrent wherein said interferometer system operates in a substantially linear manner;

selecting a second operating region for said interferometer photocurrent wherein said interferometer system operates to produce substantially only second harmonic terms of said signal components representative of the motion of said surface of said recording transducer;

said selecting step including the steps of detecting said low level pilot signal and spurious components thereof and analyzing said pilot signal and said components thereof to select first and second bias points for said interferometer system; and measuring said signal distortions appearing as an amplitude modulation of said high frequency signals with means for measuring said signal distortions tuned to said first bias point and measuring said signal distortions appearing as baseband components of said high frequency signals with said means for measuring said signal distortions tuned to said second bias point.

* * * * *

UNITED STATES PATENT AND TRADEMARK OFFICE
CERTIFICATE OF CORRECTION

PATENT NO. : 4,455,633
DATED : June 19, 1984
INVENTOR(S) : Istvan Gorog

It is certified that error appears in the above-identified patent and that said Letters Patent is hereby corrected as shown below:

Column 6, line 12          after figure "40,"
insert -- 42 --

Signed and Sealed this

Twelfth Day of March 1985

[SEAL]

Attest:

DONALD J. QUIGG

*Attesting Officer*      *Acting Commissioner of Patents and Trademarks*